US010241227B2

(12) United States Patent
Gorek

(10) Patent No.: US 10,241,227 B2
(45) Date of Patent: Mar. 26, 2019

(54) METHOD AND APPARATUS TO DETECT FORMATION BOUNDARIES AHEAD OF THE BIT USING MULTIPLE TOROIDAL COILS

(75) Inventor: Matthias Gorek, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 758 days.

(21) Appl. No.: 13/458,297

(22) Filed: Apr. 27, 2012

(65) Prior Publication Data
US 2013/0289880 A1  Oct. 31, 2013

(51) Int. Cl.
*G01V 3/30* (2006.01)
*G01V 3/28* (2006.01)

(52) U.S. Cl.
CPC . *G01V 3/30* (2013.01); *G01V 3/28* (2013.01)

(58) Field of Classification Search
CPC .................................. G01V 3/28; G01V 3/30
See application file for complete search history.

(56) References Cited

U.S. PATENT DOCUMENTS

| | | |
|---|---|---|
| 3,007,107 A | 10/1961 | Gondouin |
| 4,630,243 A | 12/1986 | MacLeod |
| 5,235,285 A | 8/1993 | Clark et al. |
| 5,339,036 A | 8/1994 | Clark et al. |
| 5,339,037 A | 8/1994 | Bonner et al. |
| 5,359,324 A | 10/1994 | Clark et al. |
| 6,064,210 A | 5/2000 | Sinclair |
| 6,184,685 B1 * | 2/2001 | Paulk et al. ............ 324/338 |
| 6,359,438 B1 | 3/2002 | Bittar |
| 6,384,605 B1 | 5/2002 | Li |
| 7,046,165 B2 | 5/2006 | Beique et al. |

(Continued)

FOREIGN PATENT DOCUMENTS

| | | | | |
|---|---|---|---|---|
| WO | WO 2009029517 | * | 3/2009 | ............... G01V 3/28 |
| WO | WO 2010006302 A2 | * | 1/2010 | |

OTHER PUBLICATIONS

Chisum, Donald, Chisum on patents : a treatise on the law of patentability, validity, and infringement, ¶ 1.03[v](excerpt, p. 1).*

(Continued)

*Primary Examiner* — Paul D Lee
*Assistant Examiner* — Mark I Crohn
(74) *Attorney, Agent, or Firm* — Mossman, Kumar & Tyler, PC

(57) ABSTRACT

An apparatus and method for a property ahead of a drill bit in a borehole penetrating a formation. The apparatus may include at least one receiver toroid disposed on a carrier and a transmitter toroid configured to induce an electromagnetic signal in the formation and disposed between the drill bit and the at least one receiver toroid. The apparatus may include at least one processor configured to estimate the property using a signal produced by the at least one receiver. The method may include estimating the property using the signal produced by the at least one receiver toroid. The method may also include one or more of: (i) generating a conductivity curve based on signals from at least one receiver toroid, (ii) validating signals from one receiver toroid based on a conductivity curve of another receiver toroid, and (iii) filtering a receiver toroid signal using lateral resistivity information.

20 Claims, 8 Drawing Sheets

(56) References Cited

U.S. PATENT DOCUMENTS

| | | |
|---|---|---|
| 7,170,423 B2 | 1/2007 | Wisler et al. |
| 7,541,813 B2 | 6/2009 | Snyder et al. |
| 7,554,329 B2 | 6/2009 | Gorek et al. |
| 7,888,940 B2 | 2/2011 | Hall et al. |
| 8,049,508 B2 | 11/2011 | Gorek |
| 8,072,347 B2 | 12/2011 | Santoso et al. |
| 2009/0179648 A1 | 7/2009 | Fredette et al. |
| 2010/0000792 A1* | 1/2010 | Alberty .................... 175/50 |
| 2010/0176812 A1* | 7/2010 | Bittar .................... G01V 3/24 324/339 |
| 2011/0133740 A1* | 6/2011 | Seydoux .................... G01V 3/28 324/338 |
| 2011/0221442 A1 | 9/2011 | Maurer et al. |
| 2011/0298461 A1 | 12/2011 | Bittar et al. |
| 2012/0068712 A1 | 3/2012 | Taherian et al. |
| 2013/0141102 A1* | 6/2013 | Donderici et al. ............ 324/338 |

OTHER PUBLICATIONS

Gianzero, S. et al., "A New Resistivity Tool for Measurement-While-Drilling," SPWLA 26th Annual Logging Symposium (1985).

Bonner, S., et al., "A New Generation of Electrode Resistivity Measurements for Formation Evaluation While Drilling," SPWLA 35th Annual Logging Symposium (1994).

Karinski, A., et al., "Feasibility of Vertical-Resistivity Determination by the LWD Sonde With Toroidal Antennas for Oil-Base Drilling Fluid," SPWLA 43rd Annual Logging Symposium (2002).

Bittar, Michael S., et al., "The Effects of Rock Anisotrophy on LWD Toroidal Resistivity Sensors," SPWLA 45th Annual Logging Symposium (2004).

Hu, G., et al., "Evaluation of Horizontal Wells Using LWD Propagation Resistivity and Laterolog-Type Resistivity Logs," SPE 103150, SPA Annual Technical Conference and Exhibition, San Antonio, TX (2006).

* cited by examiner

_US 10,241,227 B2_

METHOD AND APPARATUS TO DETECT FORMATION BOUNDARIES AHEAD OF THE BIT USING MULTIPLE TOROIDAL COILS

FIELD OF THE DISCLOSURE

This disclosure generally relates to exploration for hydrocarbons involving electrical investigations of a borehole penetrating an earth formation.

BACKGROUND OF THE DISCLOSURE

In many drilling applications it may be necessary to stop the drilling process before or shortly after the bit penetrates a new formation. In order to determine the position for stopping the drilling industry uses resistivity tools which are sensitive at or near the bit. Those resistivity tools are normally based on the usage of a toroidal coil for transmitting a current along the drill string and a receiver toroidal coil for measuring the current near the bit in direction of the borehole. Typically, a transmitter toroid and a receiver toroid are used, and the receiver toroid is typically located between the bit and the transmitter toroid. The transmitter toroid generates the current along the drill string while the receiver toroid delivers a measured current at a fixed position within the drill string.

These kinds of tools typically provide only one measurement curve. Small changes in resistivity caused by geological noise and/or small resistivity contrast at a boundary between formations may prevent estimation of some parameters ahead of the bit. Also, conditions like temperature may influence the response of the absolute measured resistivity value. The look ahead of the bit capability may be limited in quality since only small changes in resistivity are usually seen by the tool and the above mentioned factors often render such small changes as not interpretable. The information provided by those tools typically includes only one resistivity curve over the depth provided. If a zone of interest is touched, the resistivity values may change. If the contrast between the actual formation and a new formation is not sufficiently high, a misinterpretation of the resistivity curve is possible because of changes in the permeability of the toroidal carrier material to temperature, mechanical stress, etc.

SUMMARY OF THE DISCLOSURE

In aspects, the present disclosure is related to methods and apparatuses for estimating at least one resistivity property ahead of a drill bit in a borehole penetrating an earth formation using a transmitter toroid disposed between the drill bit and at least one receiver toroid.

One embodiment according to the present disclosure includes an apparatus for estimating a property ahead of a drill bit in a borehole penetrating an earth formation, comprising: a carrier configured for conveyance in the borehole; at least one receiver disposed on the carrier, responsive to an electromagnetic signal induced in the earth formation, and configured to generate a signal indicative of the property, where each receiver toroid has a unique distance from the drill bit; a transmitter toroid disposed on the carrier closer to the drill bit than the at least one receiver toroid and configured to induce the electromagnetic signal in the earth formation; and at least one processor configured to: estimate the property based on at the least one receiver toroid signal.

Another embodiment according to the present disclosure includes a method of estimating a property ahead of a drill bit in a borehole penetrating an earth formation, comprising: estimating the property using a signal from at least one receiver toroid, wherein: the signal is indicative of the property and generated in response to an electromagnetic signal induced in the earth formation by a transmitter toroid positioned on a carrier closer to the drill bit than the at least one receiver toroid on the carrier.

Another embodiment according to the present disclosure includes a non-transitory computer-readable medium product having stored thereon instructions that, when executed by at least one processor, cause the at least one processor to perform a method, the method comprising: estimating the property using a signal from at least one receiver toroid, wherein: the signal is indicative of the property and generated in response to an electromagnetic signal induced in the earth formation by a transmitter toroid positioned on a carrier closer to the drill bit than the at least one receiver toroid on the carrier.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
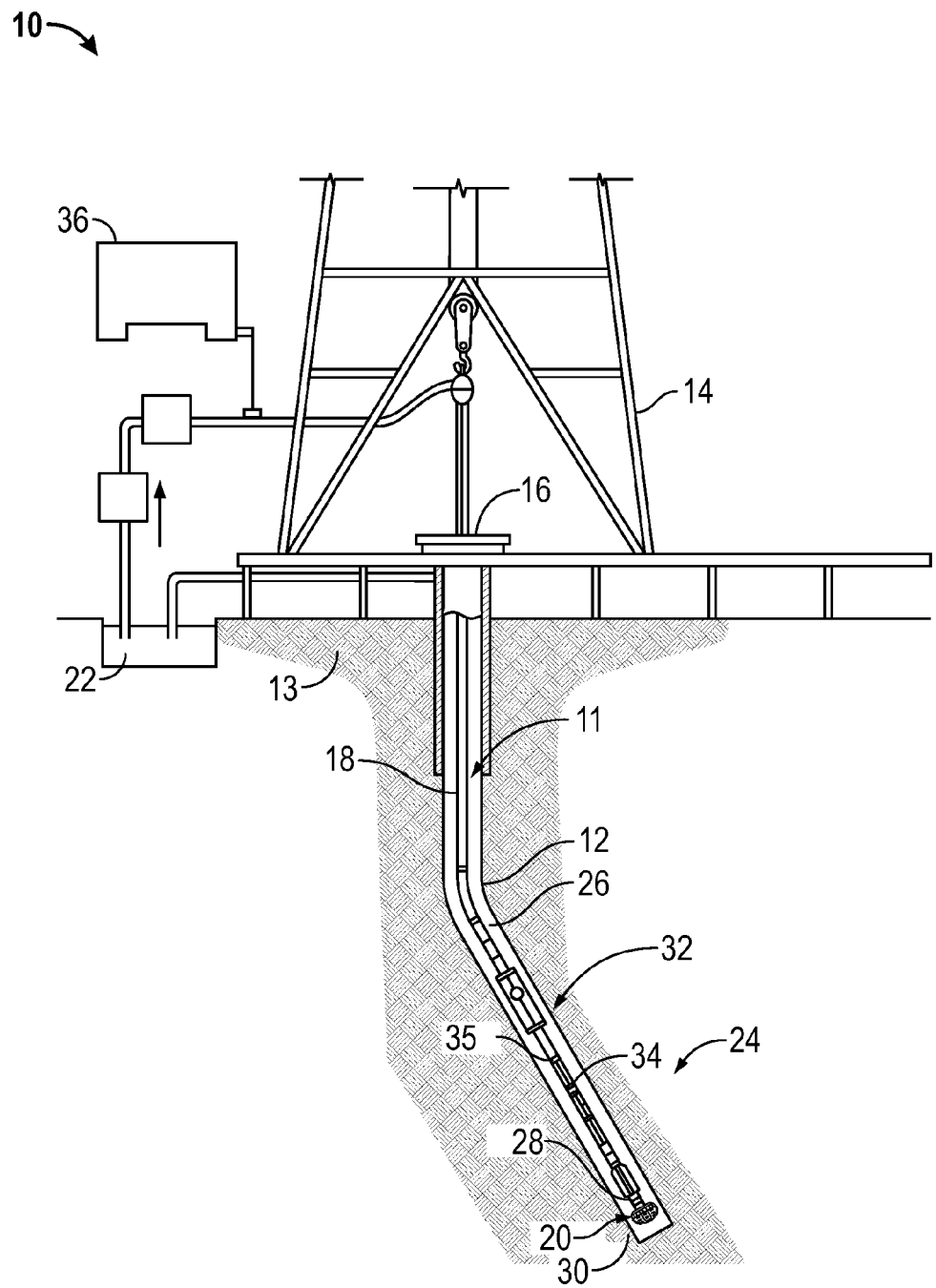
FIG. 1 shows a schematic of a bottom hole assembly (BHA) deployed in a wellbore along a drill string according to one embodiment of the present disclosure.

This disclosure generally relates to exploration for hydrocarbons involving electromagnetic investigations of a borehole penetrating an earth formation. These investigations may include estimating a resistivity property ahead of a drill bit using a transmitter toroid disposed between the drill bit and at least one receiver toroid.

Using a transmitter with at least one toroidal coil between a drill bit and at least one receiver toroid may allow electromagnetic energy from the transmitter to penetrate into the formation ahead of the drill bit. The return current may be estimated by one or more receiver toroids to provide information related to resistivity properties ahead of the drill bit. Each receiver toroid may include one or more coils. These resistivity properties may include, but are not limited to, i) a distance to a resistivity boundary between earth formations with different resistivities and ii) a resistivity of the earth formation adjacent to the resistivity boundary.

Using multiple receiver toroids, multiple curves indicative of resistivity properties of an earth formation may be produced for different depths of investigation. Multiple curves for each depth of investigation may reduce the risk of misinterpretation of a resistivity curve by providing at least one additional resistivity curve to act as a check. The different curves may be compared to each other in order to distinguish between artificial outer circumstances like temperature changes etc. and a real approaching boundary ahead of or close to the bit. This functionality may be particularly beneficial if, for example, a casing has to be placed directly at the beginning of a reservoir or a bit has to be exchanged because the new formation is expected to be harder, etc. Therefore it is important to offer a tool which is able to provide an accurate estimate of conditions ahead of the bit.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

FIG. 1 shows an exemplary embodiment of a well drilling, logging and/or geosteering system 10 includes a drill string 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. As described herein, "earth formations" refer to the various features and materials that may be encountered in a subsurface environment and surround the borehole. The term "information" includes, but is not limited to, raw data, processed data, and signals.

In one embodiment, the system 10 includes a conventional derrick 14 that may supports a rotary table 16 that is rotated at a desired rotational speed. The drill string 11 includes one or more drill pipe sections 18 that extend downward into the borehole 12 from the rotary table 16, and is connected to a drilling assembly 20. Drilling fluid or drilling mud 22 is pumped through the drill string 11 and/or the borehole 12. The well drilling system 10 also includes a bottomhole assembly (BHA) 24. In one embodiment, a drill motor or mud motor 26 is coupled to the drilling assembly 20 and rotates the drilling assembly 20 when the drilling fluid 22 is passed through the mud motor 26 under pressure.

In one embodiment, the drilling assembly 20 includes a steering assembly including a shaft 28 connected to a drill bit 30. The shaft 28, which in one embodiment is coupled to the mud motor, is utilized in geosteering operations to steer the drill bit 30 and the drill string 11 through the formation.

In one embodiment, the drilling assembly 20 is included in the bottomhole assembly (BHA) 24, which may be disposable within the system 10 at or near the downhole portion of the drill string 11. The system 10 may include any number of downhole tools 32 for various processes including formation drilling, geosteering, and formation evaluation (FE) for measuring versus depth and/or time one or more physical quantities in or around a borehole. The tool 32 may be included in or embodied as a BHA, drill string component, or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottomhole assemblies, and drill strings.

In one embodiment, one or more downhole components, such as the drill string 11, the downhole tool 32, the drilling assembly 20 and the drill bit 30, include a resistivity tool 34 configured to measure various parameters of the formation and/or borehole. These downhole tool 32 may include formation evaluation sensors (e.g., resistivity, dielectric constant, water saturation, porosity, density and permeability), sensors for measuring borehole parameters (e.g., borehole size, and borehole roughness), sensors for measuring geophysical parameters (e.g., acoustic velocity and acoustic travel time), sensors for measuring borehole fluid parameters (e.g., viscosity, density, clarity, rheology, pH level, and gas, oil and water contents), boundary condition sensors, and sensors for measuring physical and chemical properties of the borehole fluid. In some embodiments, the BHA 24 may include a resistivity tool 35 configured for estimating one or more lateral resistivity properties (substantially perpendicular to the long axis of the BHA 24).

Figure 2:
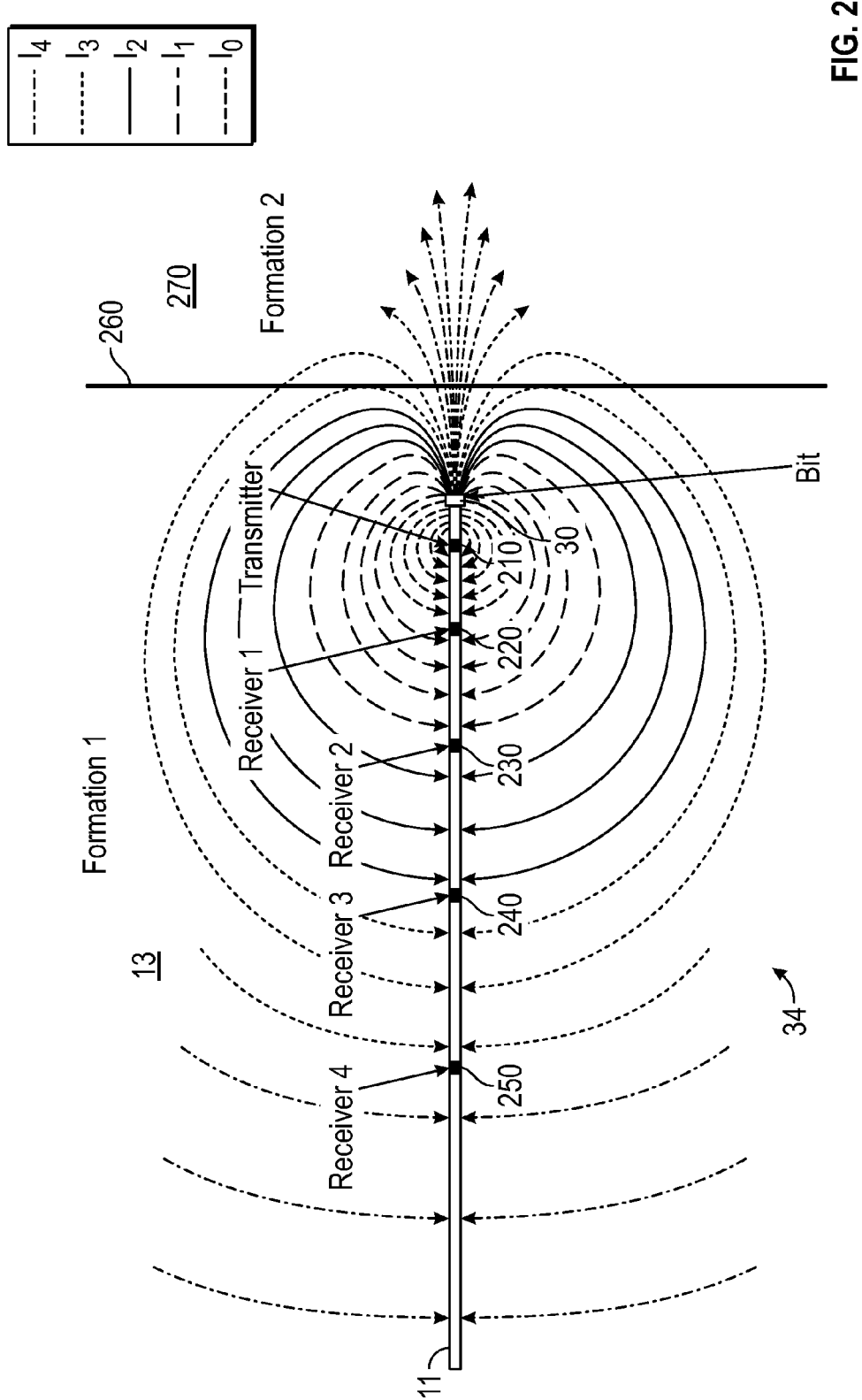
FIG. 2 shows a schematic of one embodiment of a resistivity tool with unequal spacing between adjacent toroids disposed near a formation boundary according to one embodiment of the present disclosure.

FIG. 2 shows an embodiment of resistivity tool 34 according to the present disclosure. An exemplary drill string 11 may include five (5) toroids, including a transmitter toroid 210 and four (4) receiver toroids 220, 230, 240, 250 and drill bit 30. Each toroid may include one or more coils. The transmitter toroid 210 may be disposed between the drill bit 30 and the receiver toroid coils 220, 230, 240, 250. Resistivity tool 34 may be disposed in earth formation 13 which is located adjacent to another earth formation 270. Boundary 260 may represent the division between earth formation 13 and earth formation, 270, where each of the formations 13, 270 differ with regard to at least one resistivity property. The use of four (4) receiver toroids is exemplary and illustrative only, as any number of receiver toroid may be used. Increasing the number of receiver toroid may increase resolution of the formation currents.

Since the transmitter toroid 210 is closer to the bit 30 than the receiver toroid 220, 230, 240, 250, the receiver toroids 220, 230, 240, 250 may record lateral resistivity information as well as resistivity information from ahead of the bit 30. Because the current is flowing along the drill string 11 as it returns to the transmitter toroid 210, receiver toroids 240, 250 farther from the transmitter toroid 210 measure current travelling a longer distance through the formation 13 and providing information from geologic locations more far away (e.g. ahead of the bit) while receiver toroids 220, 230 closer to the transmitter toroid 210 also include resistivity information from geologic locations closer to the transmitter toroid 210. Herein the term "information" relates to one or more of raw data, processed data, and signals.

The current monitored by receiver toroid 220 (closest to the transmitter 210) ($I_{R1}$) is the sum of all formation currents $I_i$:

$$I_{R1} = I_1 + I_2 + I_3 + I_4 = \sum_{i=1}^{4} I_i \quad (1)$$

If the drill string is equipped with n receiver toroids, the current $I_{Rm}$ passing the receiver toroid number m may be calculated by:

$$I_{Rm} = \sum_{i=m}^{n} I_i \quad (2)$$

Formation current $I_m$ may be determined using the receiver toroid current $I_{Rm}$ and the current of the next farther receiver $I_{R(m+1)}$ as calculated by:

$$I_m = I_{Rm} - I_{R(m+1)} \quad (3)$$

After extracting the formation currents $I_i$ from the receiver toroid currents $I_{Ri}$, information about different depths of investigation may be obtained by examining the currents $I_i$. If the BHA 24 with tool 34 is approaching a boundary 260 between two formations 13, 270 with different resistivity ahead of the drill bit 30, the formation current with the highest index $I_n$ will indicate the change in resistivity as the first. The other formation currents may indicate this change later related to decreasing indices. Since the currents react in a specific order, the risk of misinterpretation of the resistivity information may be decreased and the look-ahead ability improved.

Figure 3A:
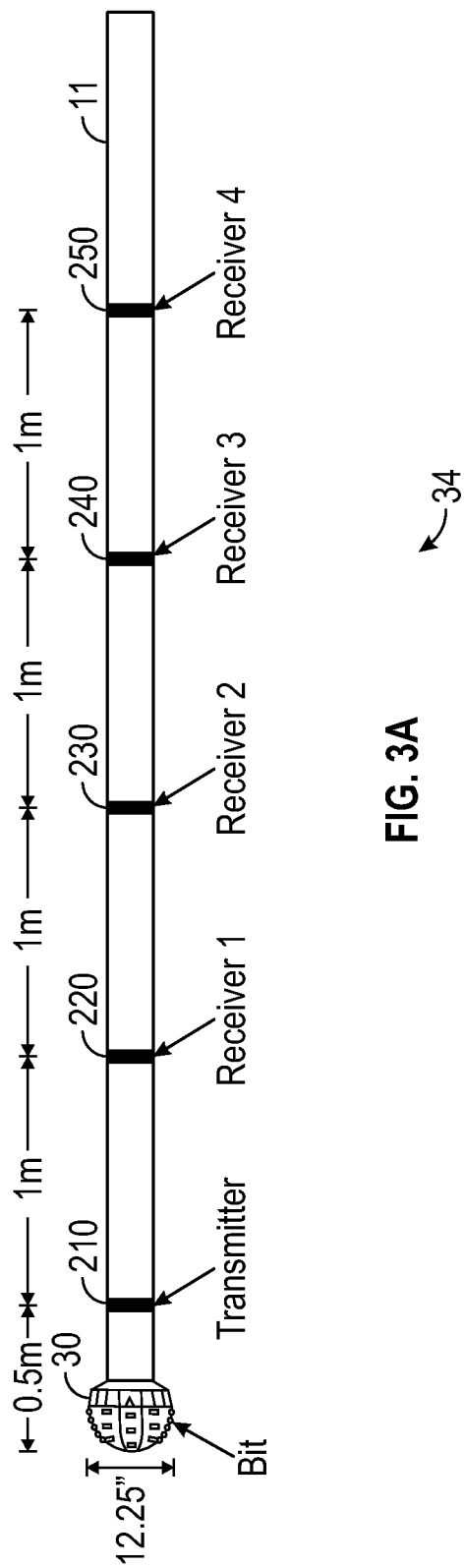
FIG. 3A shows a schematic of another embodiment of a resistivity tool with equal spacing between adjacent toroids according to one embodiment of the present disclosure.

FIG. 3A shows another embodiment of tool 34 according to the present disclosure. The toroids 210, 220, 230, 240, 250 may be spaced so that all pairs of adjacent toroids have identical spacing. In some embodiments, such as in FIG. 2, the spacing may increase between adjacent toroids as distance from the drill bit 30 increases. When tool 34 includes multiple receiver toroids 220, 230, 240, 250, a signal generated by one of the receiver toroids 220, 230, 240, 250 may be validated using signals generated by one or more of the other receiver toroids 220, 230, 240, 250. In some embodiments, signals from one or more other receiver toroids 220, 230, 240, 250 may be used to estimate a substitute signal for the signal generated by the one receiver toroid 220, 230, 240, 250.

Figure 3B:
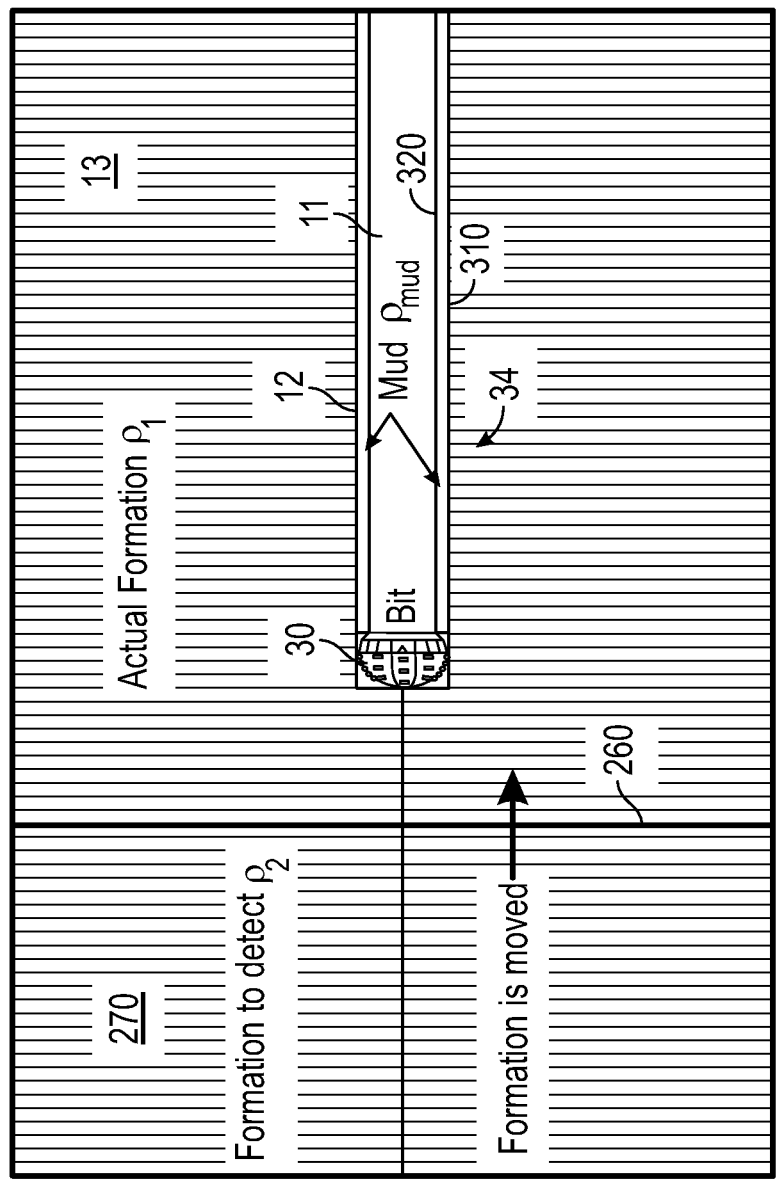
FIG. 3B shows the resistivity tool of FIG. 3A in an earth formation in proximity to a boundary with another formation according to one embodiment of the present disclosure.

FIG. 3B shows a schematic of the tool 34 of FIG. 3A in earth formation 13 as used for modeling. The tool 34 is at least partially surrounded by a small channel 310 containing conductive mud 320 with a resistivity $\rho_{mud}$. Earth formation 13 may have a resistivity $\rho_1$, and earth formation 270 may have a different resistivity $\rho_2$. The face of drill bit 30 may define the zero mark for distance in the borehole 12. Negative values for distance may indicate that the face of drill bit 30 is still in front of the boundary 260, while positive values may indicate that the bit 30 has already penetrated the boundary 260.

Figure 4A:
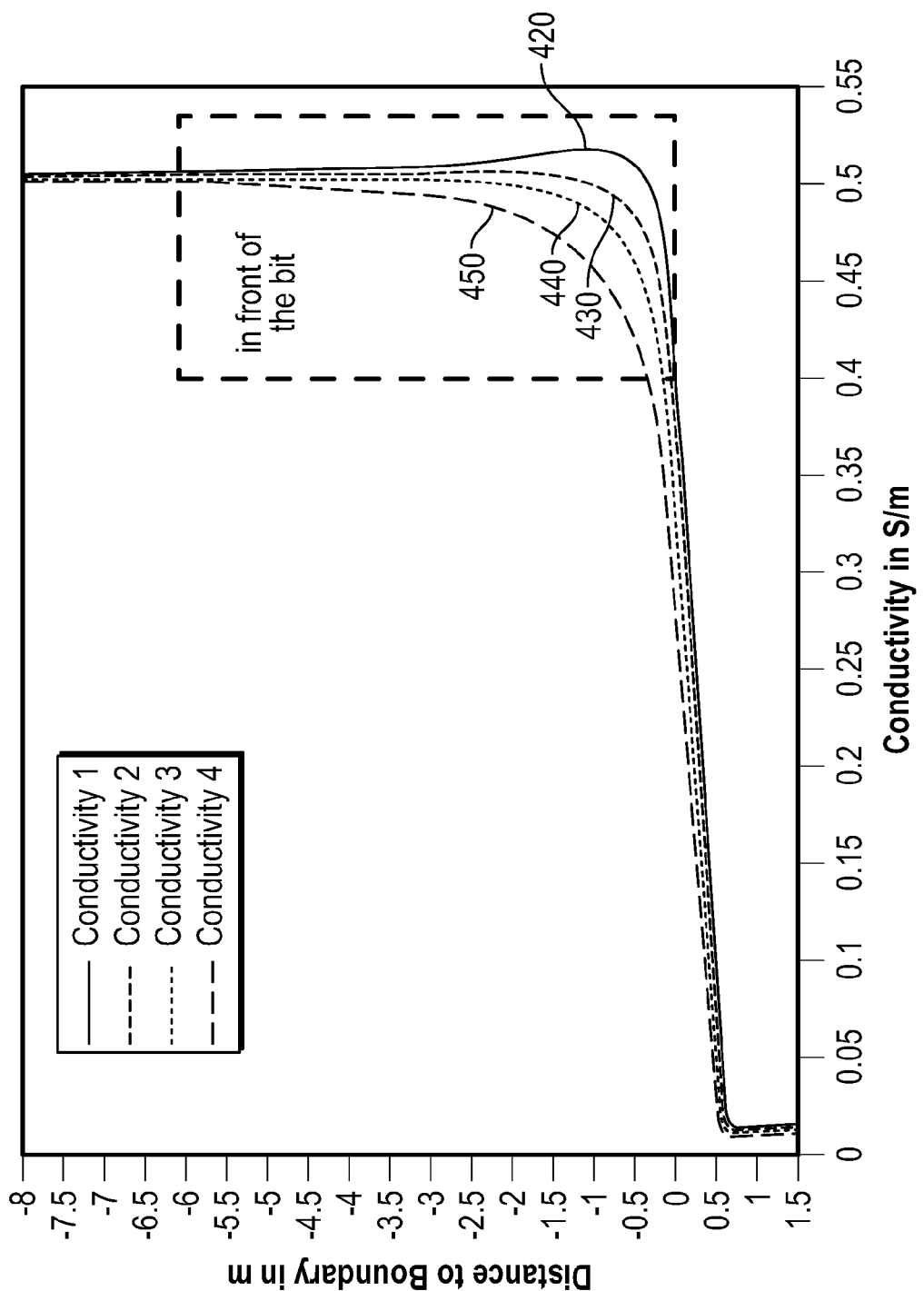
FIG. 4A shows a chart of conductivity curves generated by the resistivity tool of FIG. 3A with a formation contrast of 50 according to one embodiment of the present disclosure.

FIG. 4A shows a chart with modeling results for tool 34 in the configuration of FIG. 3A for the case that the formation contrast is 50 (formation resistivity changes from 20 Ωm ($\rho_1$) to 1000 Ωm ($\rho_2$). The currents $I_1$ to $I_4$ may be normalized to conductivities by applying an individual 1/k-factor of each current section. The conductivity curves 420, 430, 440, 450 represent the response of corresponding formation currents (receiver toroid current differences) 220, 230, 240, 250 to the signal from transmitter toroid 210. The use of conductivity curves is exemplary and illustrative only, as one of skill in the art with the benefit of this disclosure would be able to use other related curves, such as resistivity curves. The conductivity curves 420, 430, 440, 450 may indicate a clear order in response to the approaching boundary 260 ahead of the drill bit 30. Here, conductivity curve 450 indicates first response, followed, in order, by conductivity curve 440, conductivity curve 430, and conductivity curve 420. The responses are related to the formation currents at the locations of the receiver toroids 220, 230, 240, 250 within the resistivity tool 340. Since the face of the drill bit 30 is the zero distance reference point, negative values for distance to the boundary 260 indicate the distance ahead of the drill bit 30 to the boundary 260. In some embodiments, lateral resistivity information for lateral resistivity tool 35 may be used to filter lateral resistivity information from the currents $I_1$ to $I_4$ (such as, but not limited to, by subtraction).

Figure 4B:
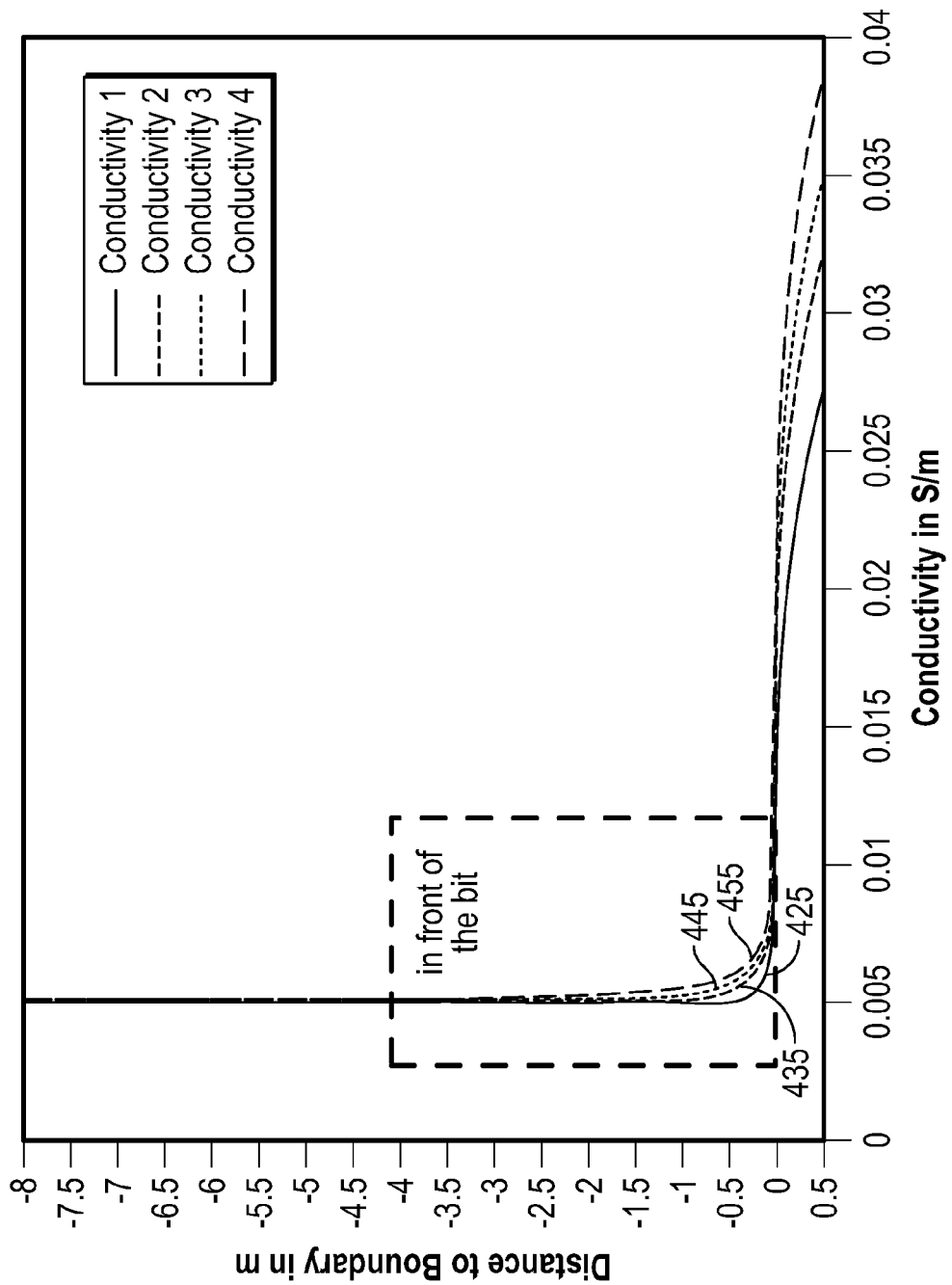
FIG. 4B shows a chart of conductivity curves generated by the resistivity tool of FIG. 3A with a formation contrast of 0.05 according to one embodiment of the present disclosure.

FIG. 4B shows a chart with modeling results for tool 34 in the configuration of FIG. 3A for the case that the formation is 0.05 (formation resistivity changes from 2000 Ωm ($\rho_1$) to 100 Ωm ($\rho_2$). The currents $I_1$ to $I_4$ may be normalized to conductivities by applying an individual 1/k-factor of each current section. The conductivity curves 425, 435, 445, 455 represent the response of corresponding receiver toroid 220, 230, 240, 250 due to the formation currents induced by the signal from transmitter toroid 210. The conductivity curves 425, 435, 445, 455 may indicate a clear order in response to the approaching boundary ahead of the drill bit 30. Here, conductivity curve 455 indicates first response, followed, in order, by conductivity curve 445, conductivity curve 435, and conductivity curve 425. The responses are related to the formation currents estimated by, and vary with the location of, the receiver toroids 220, 230, 240, 250 within the resistivity tool 34. Since the face of the drill bit 30 is the zero distance reference point, negative values for distance to the boundary 260 indicate the distance ahead of the drill bit 30 to the boundary 260. Although the order of the conductivity curves 425, 435, 445, 455 is identical to the order of conductivity curves 420, 430, 440, 450, though the range of influence ahead of the drill bit 30 may be reduced.

Figure 5A:
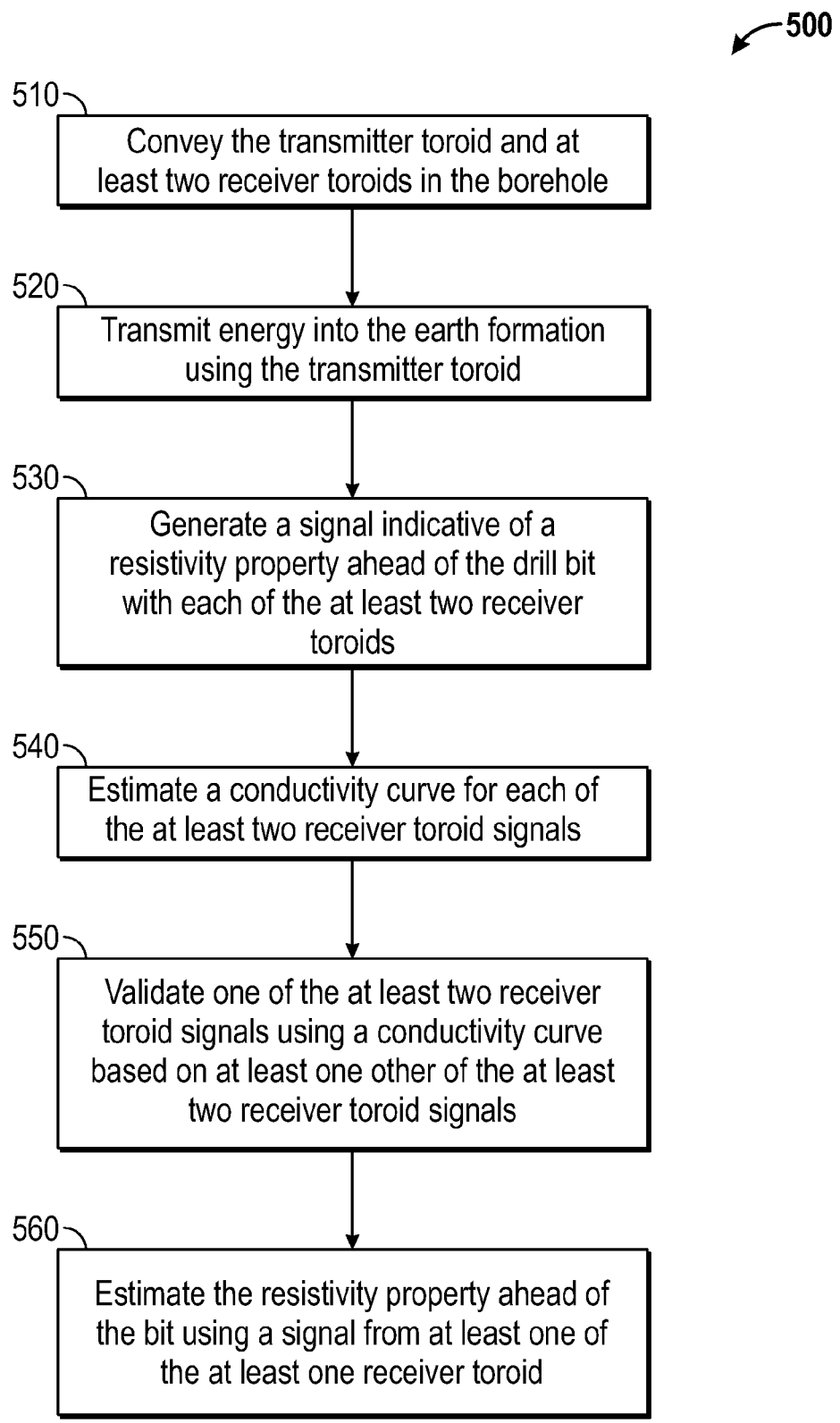
FIG. 5A shows a flow chart of a method for estimating at least one parameter of interest according to one embodiment of the present disclosure.

FIG. 5A shows a flow chart of a method 500 according to one embodiment for the present disclosure. In step 510, the BHA 24 with resistivity tool 34 may be conveyed in the borehole 12. The BHA 24 may include transmitter toroid 210 and at least two receiver toroids 220, 230, 240, 250. The transmitter toroid 210 may be disposed between the at least two receiver toroids 220, 230, 240, 250 and drill bit 30. The toroids 210, 220, 230, 240, 250 may have equal or unequal spacing between adjacent toroids 210, 220, 230, 240, 250. In step 520, energy may be transmitted into the earth formation 13 using transmitter toroid 210. The transmitted energy may induce an electric current in the earth formation 13. In step 530, signals may be generated by each of the receiver toroids 220, 230, 240, 250, the receiver toroids 220, 230, 240, 250 being responsive to the electric current in the earth formation 13, and the signals being indicative of a resistivity property of the earth formation 13. The toroids 210, 220, 230, 240, 250 may be moving along the borehole 12 while the signals are generated. In step 540, a conductivity curve may be estimated for each signal of the receiver toroids 220, 230, 240, 250.

In step 550, a conductivity curve 420, 430, 440, 450 from a first receiver toroid 220, 230, 240, 250 of the at least two receiver toroids 220, 230, 240, 250 may be validated using a conductivity curve 420, 430, 440, 450 from a second receiver toroid 220, 230, 240, 250 of the at least two receiver toroids 220, 230, 240, 250. Validation may include comparison between conductivity curves for variances. In some embodiments, validity may include comparing the variance with one or more threshold values. In some embodiments, the signal from a first receiver toroid may be validated using a signal from another receiver toroid without conductivity curves being generated from the signals. In some embodiments, step 550 may include an optional substitution of an estimated conductivity curve to replace a conductivity curve 420, 430, 440, 450 from a first receiver toroid 220, 230, 240, 250 where the estimated conductivity curve is based on conductivity curves 420, 430, 440, 450 of the at least two receiver toroids 220, 230, 240, 250. An invalid conductivity curve may be due to, but not limited to, the effects of temperature and/or mechanical defects in one or more of the receiver toroids 220, 230, 240, 250. These environmental factors and/or defects may affect the signals generated by one or more of the receiver toroids 220, 230, 240, 250. Validation may include comparing the characteristics of a conductivity curve 420, 430, 440, 450 based on signals from one receiver toroid 220, 230, 240, 250 with the characteristics of the conductivity curve 420, 430, 440, 450 based on signals from one or more other receiver toroids 220, 230, 240, 250. Estimating a conductivity curve for substitution may include, but is not limited to, interpolating the estimated conductivity curve at a position at a distance from the transmitter using signals from at least one receiver toroid located closer to the position and signals from at least one receiver toroid farther than the position. For example, interpolation between conductivity curves 420 and 440 may be used to estimate a substitute for conductivity curve 430. In some embodiments, an invalidity result and/or substitution may be triggered by a threshold difference between two or more conductivity curves. In step 560, one or more resistivity properties may be estimated using the signal of the first receiver toroid. In some embodiments, the first receiver toroid of steps 550 and 560 may be in a receiver toroid position not limited to closest to the transmitter 210. In some embodiments, steps 540 and 550 are optional.

Figure 5B:
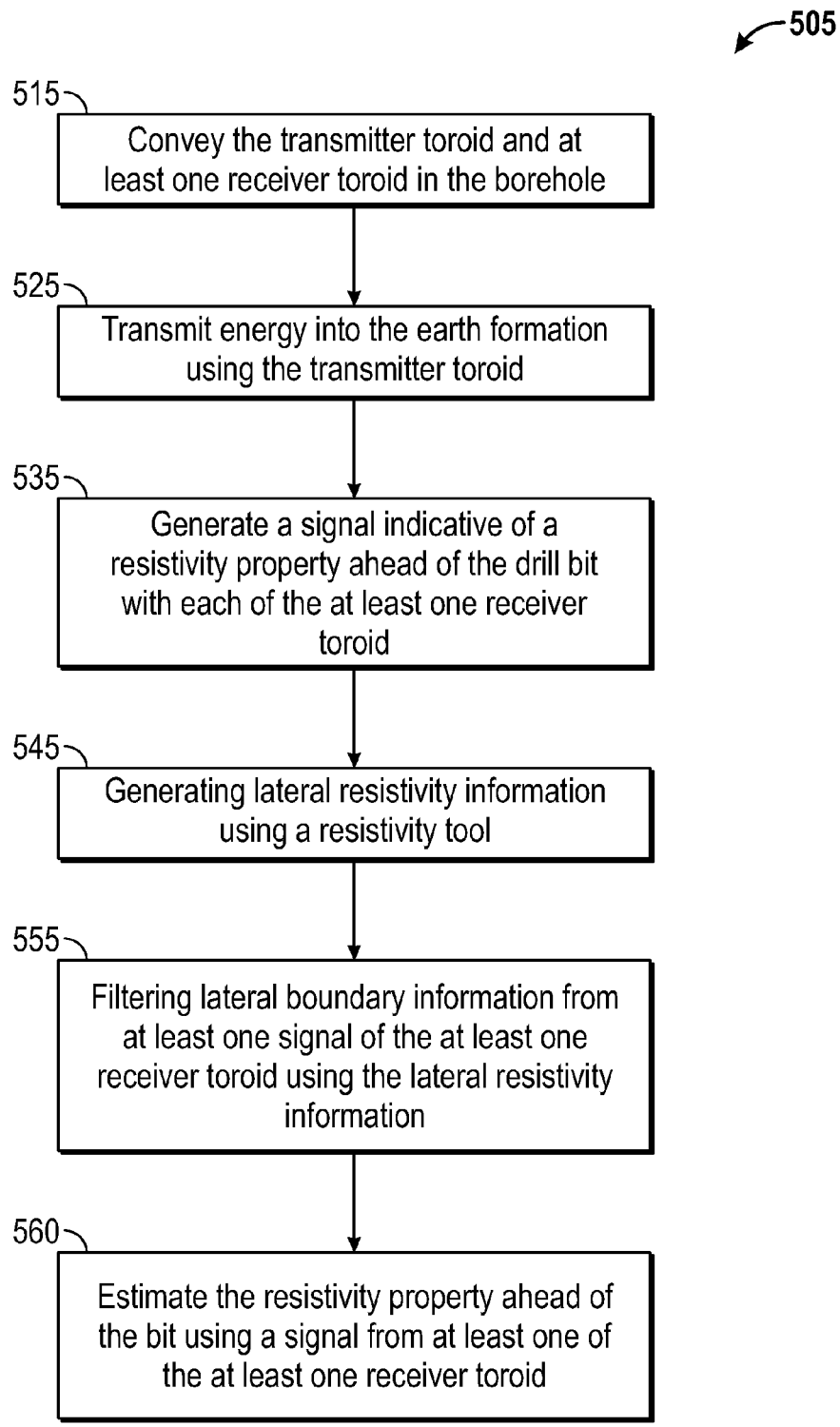
FIG. 5B shows a flow chart of another method for estimating at least one parameter of interest according to one embodiment of the present disclosure.

FIG. 5B shows a flow chart of a method 505 according to one embodiment for the present disclosure. In step 515, the BHA 24 with resistivity tool 34 may be conveyed in the borehole 12. The BHA 24 may include transmitter toroid 210 and at least one receiver toroid 220, 230, 240, 250. The transmitter toroid 210 may be disposed between the at least one receiver toroids 220, 230, 240, 250 and drill bit 30. The toroids 210, 220, 230, 240, 250 may have equal or unequal spacing between adjacent toroids 210, 220, 230, 240, 250. In step 520, energy may be transmitted into the earth formation 13 using transmitter toroid 210. The transmitted energy may induce an electric current in the earth formation 13. In step 535, signals may be generated by each of the receiver toroids 220, 230, 240, 250, the receiver toroids 220, 230, 240, 250 being responsive to the electric current in the earth formation 13, and the signals being indicative of a resistivity property of the earth formation 13. The toroids 210, 220, 230, 240, 250 may be moving along the borehole 12 while the signals are generated. In step 545, lateral resistivity information may be generated by a resistivity tool 35 configured to acquire lateral resistivity data. In step 555, lateral boundary information may be filtered from at least one receiver toroid signal using the lateral resistivity information. In step 560, one or more resistivity properties may be estimated using the signal of a first receiver toroid of the at least one receiver toroid 220, 230, 240, 250. In some embodiments, steps 545 and 555 are optional.

In some embodiments, steps 545 and 555 may be performed in method 500. Steps 545 and 555 may be performed before step 540 or after step 550. Similarly, steps 540 and 550 may be performed in method 505 (before step 545 or after 555) when method 505 is performed using at least two receiver toroids 220, 230, 240, 250.

In some embodiments, the distance from the drill bit 30 of the at least one toroid 220, 230, 240, 250 may be less than the distance from the drill bit of another toroid 220, 230, 240, 250. The one or more resistivity properties may include, but is not limited to, a distance to a boundary 260.

Implicit in the processing of the data is the use of a computer program implemented on a suitable non-transitory machine-readable medium that enables the processor to perform the control and processing. The term processor as used in this application is intended to include such devices as field programmable gate arrays (FPGAs). The non-transitory machine-readable medium may include ROMs, EPROMs, EAROMs, Flash Memories and Optical disks. As noted above, the processing may be done downhole or at the surface, by using one or more processors. In addition, results of the processing, such as an image of a resistivity property, can be stored on a suitable medium.

While the foregoing disclosure is directed to the one mode embodiments of the disclosure, various modifications will be apparent to those skilled in the art. It is intended that all variations be embraced by the foregoing disclosure.

What is claimed is:

1. An apparatus for in a borehole penetrating an the earth formation, comprising: a carrier associated with the drill bit and configured for conveyance in the borehole in connection with drilling operations with the apparatus; a plurality of receiver toroids disposed on the carrier, responsive to an electromagnetic signal induced in the earth formation, and configured to generate signals indicative of the property, wherein each receiver toroid has a unique distance from the drill bit, wherein the plurality of receiver toroids comprises at least a first receiver toroid and a second receiver toroid; a transmitter toroid disposed on the carrier closer to the drill bit than the plurality of receiver toroids and configured to induce the electromagnetic signals in the earth formation; and at least one processor configured to: extract a formation current from each receiver using the signals from the plurality of receiver toroids, wherein extracting the formation currents comprises determining a difference between a current of the first receiver toroid and a current of the second receiver toroid; identify a corresponding reaction in the formation current from each receiver indicating a change in conductivity indicative of a presence of a resistivity boundary in front of the drill bit along a direction of drilling; determine an order of occurrence of the corresponding reactions; estimate the property based on the extracted formation currents from each receiver toroid and the order of occurrence, wherein the property comprises a distance to a resistivity boundary in front of the drill bit along a direction of drilling; and control drilling operations with the apparatus based on the property.

2. The apparatus of claim 1, wherein the at least one processor is further configured to:

validate the first receiver toroid signal using the second receiver toroid signal.

3. The apparatus of claim 2, wherein the first receiver toroid distance is less than the second toroid receiver distance.

4. The apparatus of claim 2, wherein the at least one processor is further configured to:
estimate a conductivity curve for each of the receiver toroid signals, wherein validation of the first receiver toroid signal includes using the estimated conductivity curve of the second receiver toroid signal.

5. The apparatus of claim 1, wherein spacing between any two adjacent toroids of the toroids is different from the spacing between any other two adjacent toroids of the toroids.

6. The apparatus of claim 5, wherein the spacings are larger at larger distances from the drill bit.

7. The apparatus of claim 1, wherein the processor is further configured to estimate a conductivity curve for each of the receiver toroid signals using the formation currents from each receiver, wherein determining the order that the formation currents indicate the resistivity boundary comprises using the conductivity curves to determine the order.

8. The apparatus of claim 1, further comprising:
a resistivity tool configured to generate lateral resistivity information; and
the at least one processor being further configured to:
filter lateral boundary information from signals of the plurality of receiver toroids using the lateral resistivity information.

9. The apparatus of claim 1, wherein the plurality of receiver toroids are configured to generate signals indicative of the property while the receiver toroids are in motion.

10. The apparatus of claim 1, further comprising:
estimating a conductivity curve for each of the receiver toroid signals using the formation currents from each receiver;
wherein the first receiver toroid is disposed on the carrier closer to the drill bit than the second receiver toroid, and
wherein identifying the corresponding reaction in the formation current from each receiver comprises determining whether the conductivity curve of the second receiver toroid indicates the resistivity boundary before the conductivity curve of the first receiver toroid.

11. A method of estimating a property ahead of a drill bit in a borehole penetrating an earth formation, comprising: extracting a formation current from each receiver of a plurality of receiver toroids using signals from the receiver toroids, wherein each receiver toroid has a unique distance from the drill bit, wherein the plurality of receiver toroids comprises at least a first receiver toroid and a second receiver toroid; a transmitter toroid disposed on the carrier closer to the drill bit than the plurality of receiver toroids and configured to induce the electromagnetic signals in the earth formation; and wherein extracting the formation currents comprises determining a difference between a current of the first receiver toroid and a current of the second receiver toroid; identifying a corresponding reaction in the formation current from each receiver indicating a change in conductivity indicative of a presence of a resistivity boundary in front of the drill bit along a direction of drilling; determining an order of occurrence of the corresponding reactions; estimating the property based on the extracted formation currents from each receiver toroid and the order of occurrence, wherein the property comprises a distance to a resistivity boundary in front of the drill bit along a direction of drilling; and controlling drilling operations based on the property.

12. The method of claim 11, further comprises:
validating the first receiver toroid signal using the second receiver toroid signal.

13. The method of claim 11, wherein a distance of the first receiver toroid from the drill bit is less than a distance of the second receiver toroid from the drill bit.

14. The method of claim 11, further comprising:
estimating a conductivity curve for each of the signals of the receiver toroids, wherein validating the first receiver toroid signal includes using the estimated conductivity curve of the second receiver toroid signal.

15. The method of claim 11, wherein spacing between any two adjacent toroids of the toroids is different from the spacing between any other two adjacent toroids of the toroids.

16. The method of claim 15, wherein the spacings are larger at larger distances from the drill bit.

17. The method of claim 11, further comprising estimating a conductivity curve for each of the receiver toroid signals using the formation currents from each receiver, and wherein determining the order that the formation currents indicate the resistivity boundary comprises using the conductivity curves to determine the order.

18. The method of claim 11, further comprising:
generating lateral resistivity information using a lateral resistivity tool; and
filtering lateral boundary information from the signals of the plurality of receiver toroids using the lateral resistivity information.

19. The method of claim 11, wherein the signals are received by the plurality of receiver toroids while the receiver toroids are positioned at a plurality of locations along the borehole.

20. The method of claim 11, wherein:
the first receiver toroid is disposed on the carrier closer to the drill bit than the second receiver toroid,
the processor is further configured to estimate a conductivity curve for each of the receiver toroid signals using the formation currents from each receiver, and
identifying the corresponding reaction in the formation current from each receiver comprises determining whether the conductivity curve of the second receiver toroid indicates the resistivity boundary before the conductivity curve of the first receiver toroid.

* * * * *